United States Patent
Lewke

(10) Patent No.: US 8,129,979 B2
(45) Date of Patent: Mar. 6, 2012

(54) ARRANGEMENT FOR LIGHTNING DETECTION AT A WIND TURBINE

(75) Inventor: Bastian Lewke, Herning (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/090,329

(22) Filed: Apr. 20, 2011

(65) Prior Publication Data

US 2011/0273161 A1    Nov. 10, 2011

(30) Foreign Application Priority Data

May 5, 2010    (EP) .................................... 10161993

(51) Int. Cl.
*G01R 31/02*    (2006.01)
*G01N 27/60*    (2006.01)

(52) U.S. Cl. .......................... 324/72; 324/452; 324/455
(58) Field of Classification Search .................. None
See application file for complete search history.

(56) References Cited

U.S. PATENT DOCUMENTS

| 7,040,864 B2 * | 5/2006 | Johansen et al. .......... 416/146 R |
| 7,508,186 B2 * | 3/2009 | Mortensen ...................... 324/72 |
| 7,654,790 B2 * | 2/2010 | Molbech .......................... 415/1 |
| 2008/0031770 A1 | 2/2008 | Boast |
| 2010/0328084 A1 * | 12/2010 | Kraemer ...................... 340/601 |

FOREIGN PATENT DOCUMENTS

| EP | 0060756 A1 | 9/1982 |
| EP | 1788241 A2 | 5/2007 |
| WO | WO 2004044419 A1 | 5/2004 |

* cited by examiner

*Primary Examiner* — Vinh Nguyen

(57) ABSTRACT

An arrangement to detect a lightning strike in a wind turbine is provided. According to the arrangement, the wind turbines contains an ozone sensor. The ozone sensor is located close to a component of the wind turbine. The component is constructed and arranged in a way that a lightning current, which results from a lightning strike into the wind turbine, is conducted through the component. The component is constructed and arranged in a way that the lightning current results in a corona generating a certain amount of ozone gas, which is detected by the ozone sensor.

6 Claims, 1 Drawing Sheet

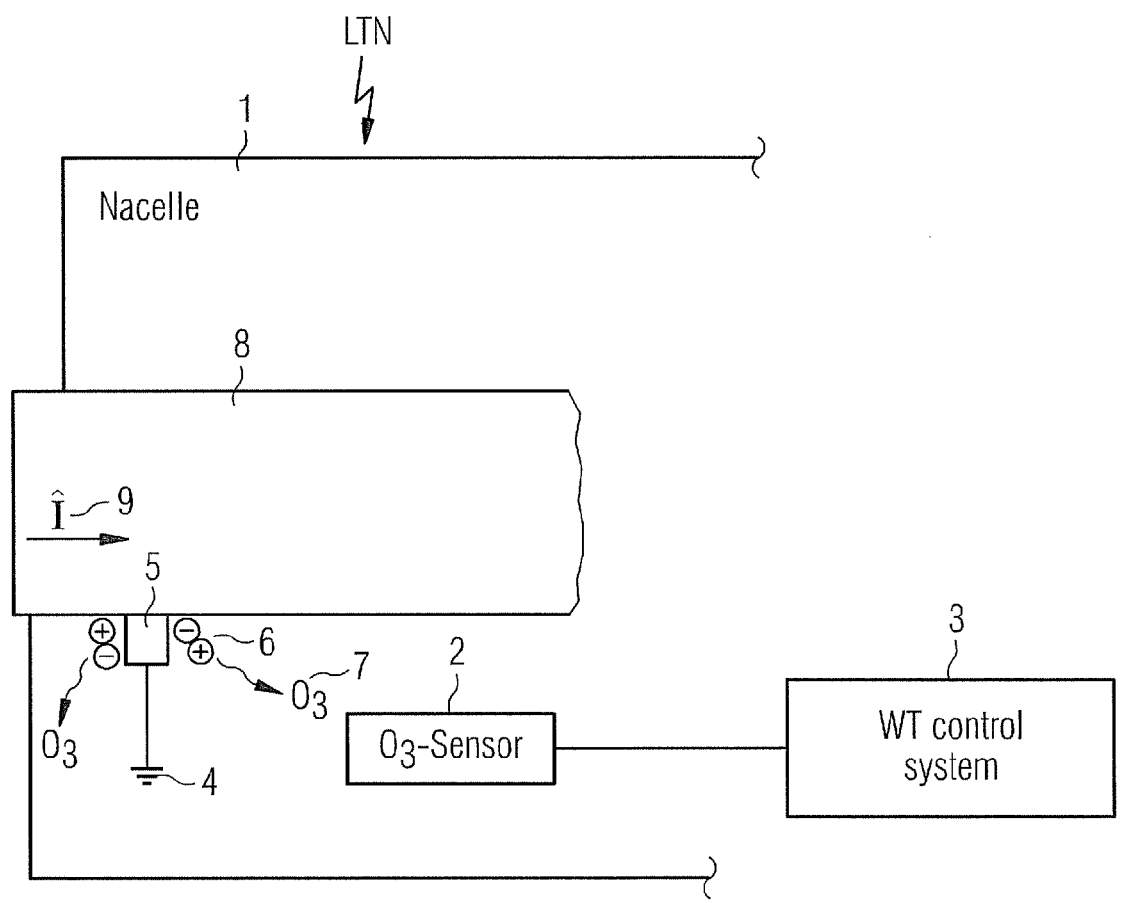

ARRANGEMENT FOR LIGHTNING DETECTION AT A WIND TURBINE

CROSS REFERENCE TO RELATED APPLICATIONS

This application claims priority of European Patent Office application No. 10161993.0 EP filed May 5, 2010, which is incorporated by reference herein in its entirety.

FIELD OF INVENTION

The invention relates to an arrangement to detect the stroke of a lightning in a wind turbine.

BACKGROUND OF INVENTION

Due to their exposed sites and due to their heights wind turbines show preferred spots for lightning strikes. In this case a large amount of energy is dissipated into the wind turbine structure.

It is known to protect wind turbines according to the guideline IEC 61400-24 with a so called "Lightning Protection Level (LPL)" of "1". For this the wind turbine must be able to withstand a specific energy of 10 MJ/Ohm with a respective peak current level of 200 kA.

Lightning impacts need to be detected and followed up to assure that wind turbine components show no failures. If a failure is detected the wind turbine needs to be stopped early enough to prevent further damages.

For example a punctual damage of a wind turbine blade may lead to a damage of the whole wind turbine, if the punctual damage is not taken into account.

SUMMARY OF INVENTION

There are two prior art systems for lightning detection in wind turbines.

The first system uses a number of magnetic cards. These cards are placed along "Franklin rods" or along down-conductors being used within or at the wind turbine. The magnetic cards are used to detect the magnetic field, which is emanated by the flow of the lightning current.

The magnetic cards are cheap, thus the system is cheap, too. The magnetic cards can not be read out remotely, a technician has to pick up the cards by hand and has to check them with a special card reader. Also a magnetic card needs to be replaced if it detected a predetermined peak current value. Thus a number of strikes might be detected, but only a maximum peak current will be stored by the magnetic card. This level is limited to approximately 110 kA.

The second system uses the so called "Jomitek System" and is especially suitable for offshore wind turbines.

This system is based on two coils that are placed outside at the basement of the wind turbine. When lightning current is conducted down from the tower to earth a magnetic field is created around the tower. This field is detected by the two coils.

The second system can be read out remotely by a turbine monitoring group. But the system only delivers a simple "flag signal"—if there is a flag-signal the wind turbine was hit by lightning. There is no further information available, for example there is no information about the level of the current, etc.

The second system requires two coils, which are located outside the tower and which are in the same horizontal plane with a phase-angle of exactly 180 degrees between them. Thus the system is difficult to be installed.

Furthermore the second system requires welded nuts on the tower-outside. This is not wanted by tower designers as the welding process requires thick tower walls, which increases the costs of the tower.

It is therefore the aim of the invention to provide an improved arrangement to detect lightning strokes on a wind turbine in a reliable and easy way also in view of the costs.

This aim is reached by the features of the independent claim.

Preferred embodiments are object of the dependent claims.

According to the arrangement invented the wind turbine contains an ozone sensor. The ozone sensor is located close to a component of the wind turbine. The component is constructed and arranged in a way that a lightning current, which results from a lightning strike into the wind turbine, is conducted through the component. The component is constricted and arranged in a way that the lightning current results in a corona generating a certain amount of ozone gas, which is detected by the ozone sensor.

Preferably the most exposed parts of the wind turbine, like the blades, are controlled by at least one ozone-sensor.

For this purpose the ozone sensor might be located within the structure of the blade. The sensor might be located inside a cavity of the blade for example.

Preferably the ozone sensor is protected by a kind of cover or shell against ambient impacts. For example the sensor is protected against ultraviolet-radiation, which might influence the ozone measurement by the sensor.

Preferably the ozone sensor is located close to brushes or spark gaps, which are used within the wind turbine to connect rotating components of the wind turbine electrically.

For example this kind of brushes or spark gaps might be used at a pitch bearing, which is used to vary the pitch of the blade of the wind turbine, if needed. Brushes are also used to connect the nacelle of the wind turbine with the tower of the wind turbine.

Brushes and spark gaps are also used on the main shaft of the wind turbine between the hub and the nacelle.

For the electrical connection the brushes are made of solid carbon and/or of copper, preferably.

A lightning, which hits the blade of the wind turbine, results into an assigned lightning current. This current is conducted from the striking-point of the blade to the root of the blade by help of a down-conductor. The down conductor is an integrated part of the blade, for example. The lightning current is transferred through the pitch system and thus is transferred through the brushes to the nacelle.

The brushes are used for the electrical connection but this connection is not a "strong and fixed" connection. The brush is only sliding or gliding along a dedicated surface of an assigned component. Due to this specific contact-situation a corona will be formed (will emanate from the brush) while the lighting current flows through the brush. Due to this corona a certain amount of ozone gas $O_3$ will be generated, which is detected by help of the ozone sensor.

Thus the ozone sensor is located close to the brush, preferably. It is used to detect the significant increase of ozone, originated by the lightning stroke.

If the brush of the blade-pitch-system is monitored the ozone sensor is located within the nacelle of the wind turbine. Due to this the sensor is isolated from ambient influences and thus the sensor is not sensitive to environmental impacts like ultraviolet-radiation.

The arrangement invented is very cheap as ozone sensors are widely used in other technical fields—like meteorology, for example.

The arrangement invented is easy to be installed, as there are a lot of "ready to be implemented solutions" are available on the market. Some of them may be even remote controlled.

BRIEF DESCRIPTION OF THE DRAWINGS

The invention is shown in more details by help of a figure. FIG. 1 shows the arrangement invented.

DETAILED DESCRIPTION OF INVENTION

Preferably the arrangement invented is located into a nacelle 1 of a wind turbine as shown here.

But also other parts of the wind turbine like the hub may be guarded by the arrangement invented.

The nacelle contains a rotary unit 8—like the main shaft of the wind turbine or like the pitch system or like the yaw system, etc.

The rotary unit 8 is electrically connected by a brush 5 with another component (not shown here in detail) of the wind turbine. In this specific case the brush 5 connects the rotary unit 8 finally with a grounding system 4 of the wind turbine.

An ozone sensor 2 is arranged or located close to the brush 5.

The ozone sensor 2 and the brush 5 are preferably located into a more or less closed volume like the nacelle 1 for example.

Thus the ozone sensor 2 is not influenced by environmental effects; the sensor 2 is not disturbed in view to the ozone measurement intended.

Preferably the ozone sensor 2 is connected with a wind turbine control system 3. This enables the wind turbine to signal an alert if needed. The alert might be sent to a remote controller for example.

If a lightning LTN strikes the nacelle 1 a corresponding lightning current 9 will be generated.

Its lightning peak current Î results in a rising of the electrical potential in view to the rotary unit 8 and the brush 5 and in relation to the grounding 4. Due to this a corona 6 will be emanated by and at the brush 5.

Due to the corona 6 ozone gas 7 is generated, which is detected by the ozone sensor 2 according to the invention.

The invention claimed is:

1. An arrangement to detect a lightning stroke at a wind turbine, comprising:
    a component of the wind turbine; the component constructed and arranged in a way that a lightning current, which results from a lightning strike into the wind turbine, is conducted through the component and that the lightning current results in a corona generating ozone gas; and
    an ozone sensor located close to the component of the wind turbine detects the generated ozone gas.

2. The arrangement according to claim 1, wherein the ozone sensor is remote controlled.

3. The arrangement according to claim 1, wherein the ozone sensor is covered by a shell or a housing to prevent that ambient influences interfere the detection of the ozone gas.

4. The arrangement according to claim 1, wherein the component of the wind turbine is a brush or a spark gap, which is used to connect a blade of the wind turbine with a hub of the wind turbine.

5. The arrangement according to claim 1, wherein the component of the wind turbine is a brush or a spark gap, which is used to connect a hub of the wind turbine with a nacelle of the wind turbine.

6. The arrangement according to claim 1, wherein the component of the wind turbine is a brush or a spark gap, which is used to connect the nacelle of a wind turbine with a tower of the wind turbine.

* * * * *